Dec. 8, 1959  R. G. RUSSELL  2,916,347
PRODUCTION OF COATED GLASS FIBERS
Filed Aug. 4, 1954  2 Sheets-Sheet 1

INVENTOR.
ROBERT G. RUSSELL
BY
ATTORNEYS

Dec. 8, 1959  R. G. RUSSELL  2,916,347
PRODUCTION OF COATED GLASS FIBERS
Filed Aug. 4, 1954  2 Sheets-Sheet 2

INVENTOR.
ROBERT G. RUSSELL
BY
ATTORNEYS

United States Patent Office 2,916,347
Patented Dec. 8, 1959

2,916,347

PRODUCTION OF COATED GLASS FIBERS

Robert G. Russell, Granville, Ohio, assignor to Owens-Corning Fiberglas Corporation, a corporation of Delaware Application August 4, 1954, Serial No. 447,876

6 Claims. (Cl. 18—54)

This invention is related to the coating of continuous glass fibers and more particularly to the application of coatings of heat liquifiable material to glass fibers in a continuous production process.

The art of manufacturing fibers or filaments of thermoplastic material such as glass has developed in recent years to the extent that the fibers may be produced at extremely high rates of speed. For example, individual continuous fibers of glass may be made at linear speeds in the order of 10,000 to 15,000 feet per minute and up. In certain instances, this high rate of production does not lend itself readily to treatment of the fibers such as the application of coatings of other materials thereto without resorting to separate handling operations. The fibers in such instances often move at such a rapid rate that heat liquifiable material, such for example, as metal heated to a molten condition, does not have an opportunity to fully wet out the glass to produce the desired coating. In addition, the frictional forces developed at the surfaces of fibers or filaments of glass moving at such rapid rates through an accumulation of coating fluid do not lend themselves to establishment of stable operating and control conditions and frequently cause uncontrollable withdrawal of quantities of the coating material.

To overcome such difficulties, it is an object of this invention to provide a new, economical, and efficient method for continuous production of metal-coated glass fibers.

It is another object of the invention to provide a method and means for producing coated glass fibers at high rates of speed with the exactness of control possible at slower rates of production.

A still further and more specific object of the invention is to provide a method and means for production of metal-coated glass fibers in which the coating operation is effected at a slow rate of speed while the fibers are permitted to be produced at extremely high rates of speed under the conditions of economy inherent in high speed production.

Glass fibers are coated with heat softenable or thermoplastic coating materials in the present invention in a two stage forming process wherein the glass is first formed into rods or large diameter fibers, termed primaries, and is then coated with a desired thickness of the coating material whereupon the composite fiber structures of glass and coating material are heated for reattenuation at a much higher rate of speed into coated fibers of much finer diameter. In the first stage of producing a coated glass fiber, the glass in the form of a primary is drawn through a bath of the coating material at rates in the order of 1 to 100 feet per minute, depending on the material being applied, while in the secondary stage of formation, depending on the diameter of the primary and the diameter desired in the finished fiber, attenuation of the finer diameter fiber may be effected at rates in the order of 10,000 feet per minute.

An important feature of the invention resides in the degree of control possible in applying coating materials regardless of the high speed at which the coated fibers may be produced.

Still another important feature resides in the simplicity of the method of production and its flexibility of adaption to additional control without detrimentally affecting production rates, nor requiring additional handling steps.

The novel features which are believed to be characteristic of my invention are set forth with particularity in the appended claims. My invention itself, however, both as to its manner of construction and method of operation, together with further objects and advantages thereof, may best be understood by reference to the following description taken in connection with the accompanying drawing, in which:

Figure 1:
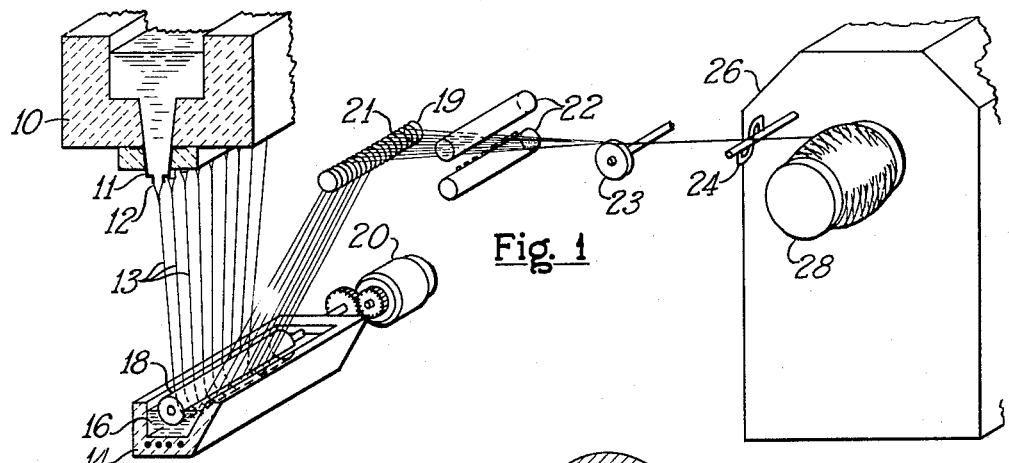
Figure 1 is a partially diagrammatic and cross-sectional view in perspective of apparatus for producing metal-coated glass fibers in accordance with the principles of the present invention.

Turning to the drawings in greater detail, Figure 1 shows apparatus for producing metal-coated glass fibers in which primaries or large diameter fibers 13 are produced from glass emitted from orifices 12 in a bushing 11 associated with a source of molten glass such as melting furnace 10. The plurality of primaries produced from the supply of glass emitted from the bushing are drawn downwardly under a dip roll 18 made of heat-resistant material such as carbon and which is rotationally mounted and partially submerged in a bath of the molten coating metal 16 contained by the electrically heated bath-type coating unit 14. The primaries in being drawn under the dip roll 18 are surrounded by the molten coating metal and are then withdrawn from the heating unit at relatively slow speeds to be passed over a grooved roll 21 before being subjected to the redraw, or reattenuation, step. The path of the primaries between the dip roll 18 and the roll 19 is made to be angular or tangential to the roll at points below the surface of the molten metal so that upon leaving the surface of the molten bath the fibers are free of contact with the roll 18, thereby assuring that the primaries are fully surrounded by the molten metal to effect a complete wetting out or coating of the primaries on all sides before the redraw step. In this respect, the molten metal is maintained at a level within the unit 14 such that the points of tangency of the primaries with the roll 18 on the emersion side of unit 14 are completely immersed.

The roll 18, it should be noted, may be adjusted in position along the length of the cooling fibers for selection of a temperature level corresponding to that at which the most favorable conditions of application or most desirable properties are imparted to the coated fibers. Although the roll 18 is illustrated as being fixedly mounted, it should also be noted that under certain conditions of operation it can be arranged to have the roll removably mounted or positionable in the bath to facilitate start up of the operation.

The roll 19 is provided with a plurality of spaced annular grooves 21 for alignment of the coated primaries in spaced relation to prevent their making premature intercontact and thus assuring a complete coating before being gathered into a strand. The distance between the rolls 18 and 19 is such that the coating material is sufficiently solidified before passage over the roll 19 that contact with the roll 19 will not result in nonuniformities being imparted to the surfaces of the coating material. The roll 19 is driven at controlled speeds by a motor 20 to aid in providing the forces necessary to draw the primaries through the bath of metal 16 as well as to control and provide the forces necessary for attenuation of the primaries from the bushing orifices 12.

Upon leaving the driven roll 19, the coated primaries are passed between a pair of reheating units such as burners 22 disposed on opposite sides of a plurality of primaries. The reheating units it will be understood might comprise any of a number of heating devices such as a single flame burner, electric heaters or radiant gas burners. The burners 22 are suitably arranged to reheat the coated primaries to a heat-softened stage sufficient that fibers 27 can be attenuated therefrom by the winding or collection forces exerted by a collection unit such as a collet winder 26. The secondary or smaller coated fibers are then gathered in strand form by suitable means such as a guide eye or rotary gathering wheel 23 before being wound on a collection tube 28 mounted on a collet winder 26 and suitably traversed by a traversing mechanism such as a spiral wire traverse 24. The spaced fibers on passage between the burners 22 are heated locally to bring the temperature of the metal-coated glass up to at least a thermoplastic condition where the winding forces are sufficient to reattenuate the composite structure of glass and metal into a finer diameter coated fiber 27.

Figure 2:
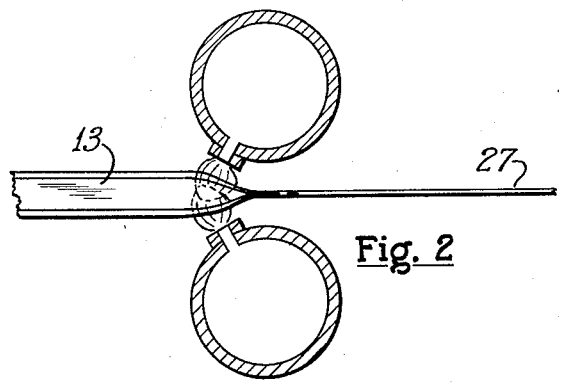
Figure 2 is an enlarged view of the neck-down portion of a single metal-coated glass fiber being attenuated from a primary fiber of Figure 1.

Figure 2 shows the necking down of the glass and metal which takes place within the localized reheating zone of each primary. In this respect, the primary is provided with sufficient coating metal to permit spreading or complete envelopment of the redrawn fiber. Various metals and alloys of metal may be applied to the glass fibers according to the present invention. Metals such as aluminum, antimony, cadmium, cobalt, chromium, copper, gold, lead, nickel, platinum, silver, tin, titanium or alloys of these metals may be coated on the fibers. For some metals, such for example as antimony, a controlled atmosphere may be preferred or might be required to effect uniform coating of the glass fibers.

If desired, additional amounts of the same metal or different metal for alloying may be applied to the fiber in the reheat zone, utilizing heat of the burners to melt down the added metal before or upon introduction to the fiber being attenuated. A flux material can also be added to protect coating metal from overoxidation during the redrawing process. Correspondingly, the finer diameter fiber which is already coated with metal can be additionally coated by another layer of the same or different metal such as in an associated or separate electroplating process. As a further modification, the coated fibers may be introduced into a blast of a disrupting burner blower to produce metal-coated discontinuous wool fibers instead of forming a textile strand as illustrated. In the latter arrangement, the metal-coated wool fibers may also be mixed with other fibrous material such as a cellulose wool, asbestos or other inorganic or organic fibrous materials. A still further arrangement and refinement which can be utilized to improve the coating operation is to provide a controlled synthetic atmosphere of desirable optimum gaseous composition about the point of emersion of the primaries from the bath of metal 16 as well as in the vicinity of the burners 22 to effect optimum coating characteristics corresponding to the properties desired in the finished fiber and determinable by the surrounding atmosphere.

Figure 3:
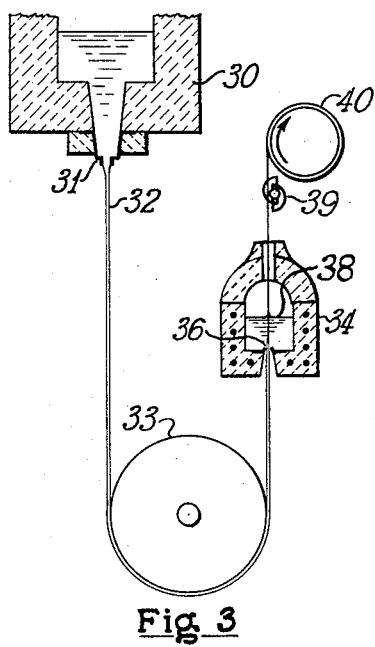
Figure 3 is a somewhat diagrammatic view partially in cross-section of a modified form of apparatus for producing metal-coated glass fibers wherein the heat of the molten metal coated on the secondary fiber is utilized to raise the temperature of the glass for attenuation.

Figure 3 shows an alternative method and arrangement by which glass primaries such as a glass primary 32 drawn from a bushing 31 associated with a source of molten glass such as melter furnace 30 is passed down under a redirectioning roll 33, and then upwardly through a small self-sealing orifice 36 of a coating unit 34 to be reheated and redrawn within a molten bath of metal 38 contained therein. The fiber is thus heated by the molten metal and simultaneously coated and reattenuated in the bath of metal 38 whereupon it is wound on a collection tube 40 traversed by a suitable traverse mechanism such as a spiral wire traverse 39. The glass primary is started through the orifice 36 by pulling it through with a wire member made of a refractory or high heat resistant metal such as platinum. As indicated, this general arrangement has an advantage in that the redraw operation in being effected within the bath of coating metal 38 can utilize the heat of the molten metal to effect a reheat of the fiber for the redraw operation. The molten metal here is of necessity maintained at a temperature level above the solidification point of the glass although it may be a metal with a lower melting point characteristic.

The unit 34 has a dome-type upper portion to permit retention of an atmosphere of controlled composition for establishment of conditions promoting certain desirable coating characteristics. Gases such as argon or cracked ammonia might be used for such purposes. A fluxing material might in some instances be used for control of metal surface conditions. Borax glass or powdered charcoal may be used for such purposes. Either the gas or fluxing material may be conveniently introduced into the upper chamber of the unit by way of a suitable inlet not shown but which may be readily provided in the side of the dome structure.

Figure 4:
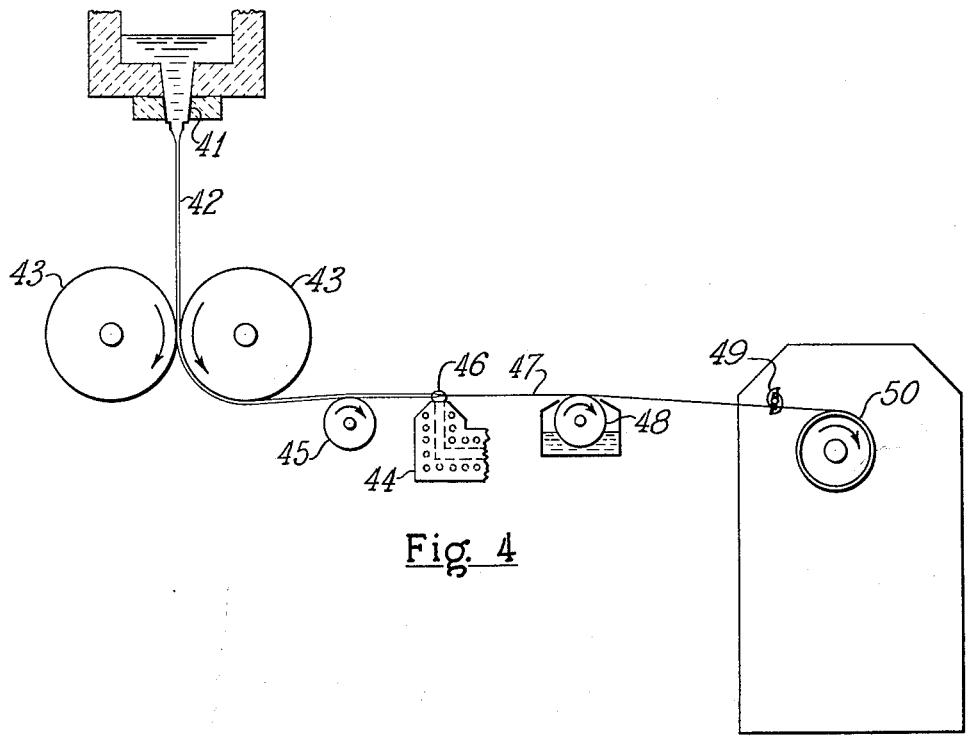
Figure 4 is a diagrammatic side elevational view of another arrangement for producing coated glass fibers utilizing heat of the molten metal for attenuation.

In the arrangement of Figure 4, glass primary fibers are produced by attenuating glass from a feeder 41 with a pair of mated pulling wheels 43 arranged to draw the glass into fibers such as a primary 42. The primary is directed about one of the pulling wheels 43 to take a generally horizontal path over an idler guide roll 45 and then through a globule or accumulation of molten metal 46. The metal is supplied from the orifice of a heating unit 44 having an associated source of molten metal such as a heated reservoir not shown. The molten metal in the accumulation 46 is maintained at a temperature sufficient to heat the glass to a condition of lower viscosity on introduction thereto such that the glass and metal coated thereon may be attenuated as a composite structure under the influence of regulated forces exerted longitudinally by suitable means such as a collet winder 50.

Before collection into a package by the winder, the fiber may be passed over a size applicator such as a roll type applicator 48 for a coating of size fluid. The sizing fluid may be any of a wide range of materials which lend themselves to providing lubrication of the coated surfaces for contact with other surfaces such as those of other fibers which might be grouped in intimate contact therewith. In this respect, a sizing material is preferably an oily or waxy material predominantly a lubricant such as petroleum oil, vegetable oil, or an oxide, sulphide, or chloride composite of the metal or an alcohol, an organo siloxane, or other recognized lubricants for metals may be used.

Figure 5:
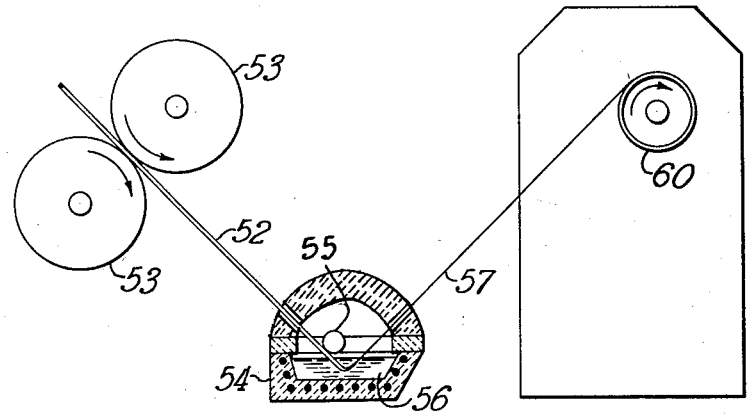
Figure 5 illustrates still another arrangement for producing metal-coated fibers utilizing heat of the coating metal for attenuation.

Figure 5 shows still another method and arrangement for producing metal-coated glass fibers wherein a relatively thick primary or rod of glass having lateral rigidity is introduced to a bath of molten metal to be heated to a viscous condition for attenuation in coated form. The primary 52 is fed longitudinally into the bath 56 of the molten metal by a pair of feed rolls and is stabilized in its introduction by a guide roll 55 disposed above the surface of the molten bath. The bath is held in an electrically heated container 54 having openings through which the primary may be introduced and a secondary withdrawn in coated condition.

The coated secondary fiber 57 is attenuated from the primary 52 below the level of the molten bath under the influence of a constant pull exerted by suitable means such as a winder unit 60. The attenuation force is exerted in a lateral direction at the end of the primary with the guide roll 55 acting as a lateral bearing to stabilize introduction of the primary against the attenuating forces which are exerted in a direction angular to the primary. As in the arrangement of Figure 3, the container 54 is provided with a dome shaped upper portion within which a controlled atmosphere of predetermined composition may be conveniently retained to promote certain desirable coating conditions.

It will be apparent from the foregoing that while particular embodiments of the present invention have been shown and described, it will be obvious to those skilled in the art that changes and modifications may be made without departure from this invention in its broader aspects and, therefore, the aim in the appended claims is to cover all such changes and modifications as fall within the true spirit and scope of this invention.

I claim:

1. The method of producing coated continuous glass fibers comprising passing a glass primary fiber through a bath of heat-liquefied coating material, reheating said primary fiber to a softening temperature in said bath, and exerting an attenuating force on said primary fiber to attenuate said fiber within said bath to produce a thinner secondary fiber coated by a layer of said coating material.

2. The method of producing coated continuous glass fibers comprising heating and attenuating a glass primary fiber into a continuous thin secondary fiber, and simultaneously applying to said secondary fiber in the zone where attenuation occurs a coating of heat-liquefied coating material.

3. The method of producing metal-coated continuous glass fibers comprising the steps of forming a glass primary fiber, passing successive portions of said primary fiber through an accumulation of molten coating metal having a temperature in the attenuation temperature range of said glass, heating the portions of the primary fiber in said accumulation with heat of the metal to an attenuation temperature for the glass, reattenuating a continuous secondary coated fiber from said primary fiber, and allowing said coated secondary fiber to cool to a set condition.

4. The method of producing metal-coated continuous glass fibers comprising the steps of relatively slowly feeding a glass primary fiber into an accumulation of molten coating metal, said metal being maintained at a temperature in the attenuation range of said glass, heating said fiber within said accumulation to a softened condition, and at a more rapid rate attenuating a coated thin glass secondary fiber from a portion of said primary fiber raised to attenuation temperature by said accumulation.

5. The method of producing coated continuous glass fibers comprising feeding a rod of glass forward lengthwise into a molten bath of coating material by which it is heated and softened, attenuating the softened glass while in said bath to form a relatively fine continuous fiber, and withdrawing said continuous fine fiber from said bath with a coating of the bath material thereon to form a coated filament of glass.

6. The method of producing thin continuous glass fibers comprising passing a glass primary fiber through a bath of heat-liquefied material, reheating said primary fiber in said bath to a softening temperature under the influence of the temperature of said bath and exerting an attenuating force on said primary fiber to attenuate said fiber within said bath to produce a thinner secondary fiber.

References Cited in the file of this patent

UNITED STATES PATENTS

| | | |
|---|---|---|
| 1,033,912 | Lendi | July 30, 1912 |
| 2,269,459 | Kleist | Jan. 13, 1942 |
| 2,272,588 | Simison | Feb. 10, 1942 |
| 2,313,296 | Lamesch | Mar. 9, 1943 |
| 2,569,700 | Stalego | Oct. 2, 1951 |
| 2,616,165 | Brennan | Nov. 4, 1952 |
| 2,679,823 | Denham | June 1, 1954 |
| 2,699,415 | Nachtman | Jan. 11, 1955 |
| 2,772,518 | Whitehurst et al. | Dec. 4, 1956 |
| 2,782,563 | Russell | Feb. 26, 1957 |